United States Patent
Kaplan

[11] 3,988,974
[45] Nov. 2, 1976

[54] INSTANT COFFEE BREWER

[76] Inventor: Murray Kaplan, 66 Wooleys Lane, Great Neck, N.Y. 11023

[22] Filed: May 13, 1975

[21] Appl. No.: 577,095

[52] U.S. Cl. ................................ 99/285; 99/300; 99/323.3
[51] Int. Cl.² ........................................ A47J 31/00
[58] Field of Search ............ 99/279, 280, 281, 299, 99/300, 292, 294, 285, 302, 323.3

[56] References Cited
UNITED STATES PATENTS

| | | | |
|---|---|---|---|
| 3,087,415 | 4/1963 | Kaplan et al. | 99/281 |
| 3,270,918 | 9/1966 | Goodrich et al. | 99/281 X |
| 3,423,209 | 1/1969 | Weber | 99/299 X |
| 3,549,380 | 12/1970 | Patel et al. | 99/300 X |
| 3,641,918 | 2/1972 | Schellgell et al. | 99/279 |
| 3,650,201 | 3/1972 | Jovanovic | 99/279 |

*Primary Examiner*—Edward L. Roberts
*Assistant Examiner*—Arthur O. Henderson
*Attorney, Agent, or Firm*—Darby & Darby

[57] ABSTRACT

A brewer, for making predetermined quantities of instant (water-soluble) coffee, having a heating chamber where the water is heated, a brewing chamber within the heating chamber and connected to an outlet, and means for transferring a predetermined quantity of heated water from the heating chamber to the brewing chamber in such a manner that the heated water enters the brewing chamber with a swirling action that dissolves and mixes the coffee in the heated water.

11 Claims, 2 Drawing Figures

INSTANT COFFEE BREWER

BACKGROUND OF THE INVENTION

Regular brewed coffee has at least two important disadvantages compared to instant coffee. First, regular coffee begins to spoil within a short time after brewing while instant coffee does not begin to spoil until, typically, 6 hours after brewing. The slower spoiling rate for instant coffee makes it possible to restore the coffee level in an instant coffee brewer by adding additional instant coffee and a predetermined quantity of water to the remnant of the previous batch with less danger of mixing spoiled and fresh coffee than is present with regular coffee. The slower spoiling rate of instant coffee also permits a large quantity to be brewed and consumed over a long time period without spoiling. This enables larger and fewer batches of instant coffee to be brewed than is possible with regular coffee and reduces waste from spoiled coffee. The less frequent brewing of instant coffee yields a saving in labor costs because less attention need be paid to the coffee brewer. Second, there is a shrinkage of the water volume during the process of brewing regular coffee caused by absorption and retention of water by the coffee grounds. As the amount of water absorbed by the grounds is variable, it is difficult to accurately determine the amount of coffee that will be produced. This may cause either too little or too much coffee to be brewed with the possibilities of users being left without coffee or of the excess coffee being wasted when it spoils.

The above-mentioned disadvantages of regular coffee become especially acute in institutions, e.g. hospitals, where consumption of coffee may be large and spread over extended time periods rather than concentrated in a few short peak periods such as one-hour lunch or dinner servings. Under these circumstances, brewing of large quantities is desirable to minimize labor expenses, and some coffee will stand for a relatively long time period between brewing and consumption. With regular coffee, some coffee may stand for too long and spoil and thus be wasted. The possibilities of wasting coffee are further increased because the inability to accurately predetermine the amount of coffee brewed may inadvertently lead to brewing too much coffee.

These disadvantages of regular brewed coffee can be largely overcome by use of instant coffee for which coffee brewers have special requirements. To most fully utilize the advantages of instant coffee, the coffee brewer should be capable of making large, as well as accurately determinable and easily controllable, quantities of coffee. The instant coffee brewer should also have provisions for easily restoring the coffee level by adding additional instant coffee and more water.

Regular coffee is usually brewed by a so-called "drip" process in which hot water flows by gravity through ground coffee beans. The water extracts the coffee flavor from the beans and leaves behind the coffee grounds. Although mechanical devices, for example, a pump, may be used to raise the water above the coffee beans prior to brewing, the actual brewing process typically requires no mechanical assistance. In contradistinction, instant coffee is typically brewed by placing the instant coffee crystals in the bottom of a cup or pot, adding hot water and stirring until the coffee crystals have dissolved and mixed with the water. If large quantities of instant coffee are to be made, manual or, more likely, mechanical agitation will usually be necessary to dissolve and mix the instant coffee with the water. The mechanical simplicity of the regular coffee maker will thus be lost unless the instant coffee brewer is provided with means for dissolving and mixing the coffee crystals with the water without need for mechanical agitation.

SUMMARY OF THE INVENTION

It is an object of the present invention to provide a coffee brewer for instant coffee capable of making a large quantity of instant coffee in a single brewing.

It is another object of the present invention to provide an instant coffee brewer in which the coffee level is easily restored.

It is yet another object of the present invention to provide an instant coffee brewer for brewing a predetermined amount of instant coffee.

It is a still further object of the present invention to provide an instant coffee brewer provided with means for causing water entering the brewing chamber to readily and quickly dissolve and mix with a supply of instant coffee during the brewing process without requiring any mechanical agitation.

According to a preferred form of the invention, a heating chamber is supplied with the desired amount of water which is heated by any suitable heating element. An amount of powdered instant coffee sufficient to brew the desired amount of coffee is placed at the bottom of the brewing chamber. After the water is heated to the desired temperature, a predetermined amount of water is transferred from the heating chamber to the brewing chamber through fluid flow means connecting the heating chamber and the brewing chamber. The water enters the brewing chamber through a nozzle directed approximately parallel to the brewing chamber wall at the point of entrance and partially downwardly. This nozzle configuration causes rotation and turbulence of the water in the brewing chamber and mixes and dissolves the coffee powder with the water. The brewing chamber is provided with an outlet communicating with a spigot through which the brewed coffee is withdrawn.

The present invention will be better understood from consideration of the following description together with the appended drawings in which:

DESCRIPTION OF THE PREFERRED EMBODIMENT

Figure 1:
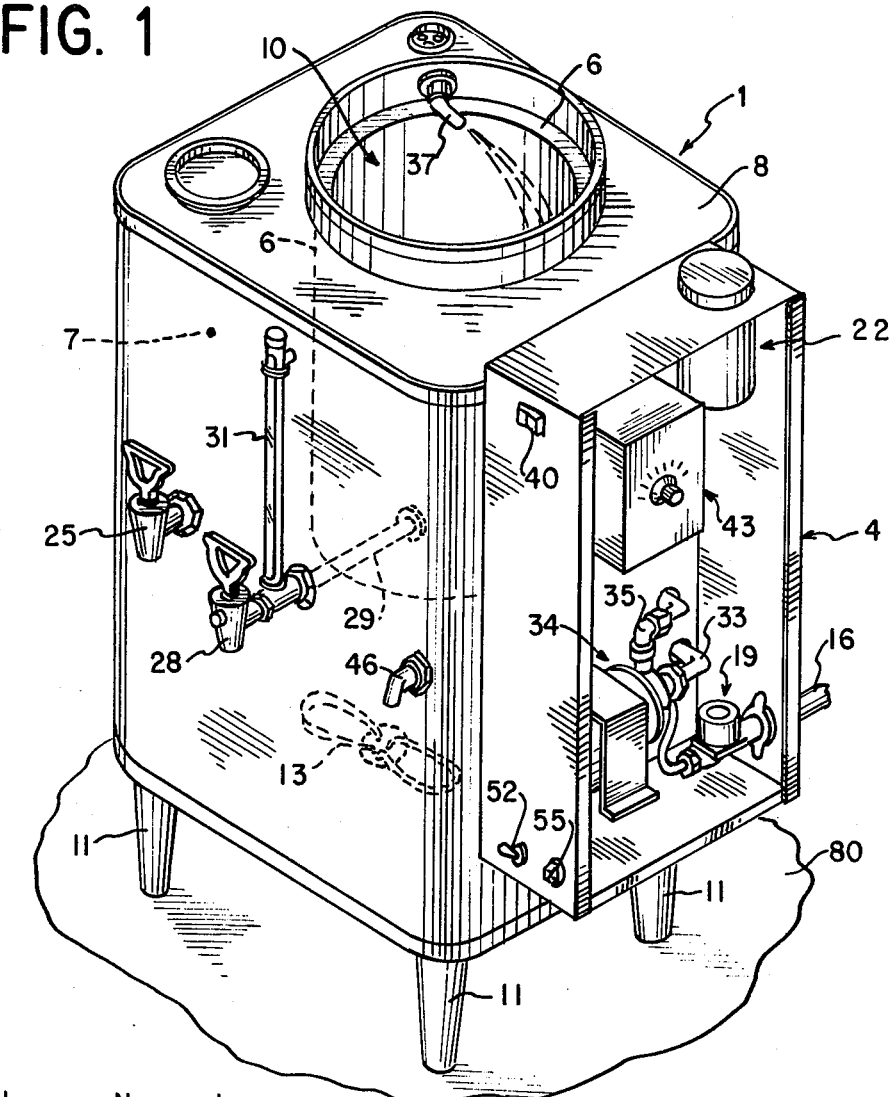
FIG. 1 is a perspective view of the instant coffee brewer with cover removed.

A preferred embodiment of the instant coffee brewer 1 is shown generally in perspective in FIG. 1. Coffee brewer 1 is generally box-like in shape although other shapes may be used provided they are suitable for containing the components described below. Control box 4, shown with its side cover panel removed, contains the electrical circuit and related parts described below and is attached to one side of the coffee maker by any suitable means.

A liner 6 in the interior of coffee brewer 1 divides the interior of coffee brewer 1 into a heating chamber 7 and a brewing chamber 10. Liner 6 is preferably generally cylindrical in shape and positioned with its axis vertical. It preferably has a removable cover, not shown. Liner 6 need not extend the full vertical or horizontal extent of coffee maker 1 and typically will extend downwardly from the top of coffee maker 1 to a plane spaced from the bottom of coffee maker 1. The cylindrical interior of liner 6 forms brewing chamber 10 while the space intermediate liner 6 and the outer walls of coffee maker 1 forms heating chamber 7. Heating chamber 7 may be covered by metal piece 8 to which liner 6 is securely attached by any suitable means. Liner 6 has a bottom which is slightly convex downwardly towards an outlet (not shown). Heating chamber 7 is connected to outlet spigot 25 and the outlet of brewing chamber 10 communicates with outlet spigot 28 by any suitable pipe 29. Gauge glass 31 is connected to outlet spigot 28 by conventional means and permits the coffee level in brewing chamber 10 to be easily monitored. A heating element 13 is positioned proximate and underneath or in the bottom of heating chamber 7. Any conventional heating element, for example, a thermostatically controllable high resistance element, may be used. Legs 11 space coffee brewer 1 from the surface 80 on which the brewer is placed and prevent the heating element from damaging the surface.

Control box 4 contains a water inlet pipe 16, solenoid valve 19, pump 34, timer 43, and level float 22. A stop cycle switch 52 and brew button 40 are mounted in the front of the control box 4.

In operation the water enters heating chamber 7 through inlet pipe 16 and solenoid valve 19. A mechanism, such as level float 22, which is responsive to the water level in heating chamber 7 controls solenoid valve 19. As explained below, it causes valve 19 to close and terminate the water flow into heating chamber 7 when the water reaches the desired level and causes valve 19 to open and permit water to flow into heating chamber 7 when the water falls below the desired level. An overflow outlet 46 suitably connected to a point near the top of the heating chamber 7 permits the flow of water from heating chamber 7 if the water level rises excessively.

In the preferred embodiment, heated water is caused to flow between heating chamber 7 and brewing chamber 10 through a pipe 33 from heating chamber 7 to pump 34 and then through conventional piping 35, which terminates in a nozzle 37. Nozzle 37 is preferably spaced slightly inwardly from and directed approximately parallel to the interior wall of liner 6 at the entrance point and also points downwardly at an angle that is typically about 45°. It has been found that spacing the nozzle inwardly approximately 1 to 2½ inches from the liner wall is desirable to produce rapid mixing of the water and coffee, although the distance may be selected otherwise to produce the desired effect. As shown by the dashed lines in FIG. 1, the trajectory of the water upon exiting from nozzle 37 is partially downward and may hit the liner wall or the bottom of the liner near where the bottom meets the wall. The criteria to be satisfied are that the position and angle of nozzle 37 are such that the water entering brewing chamber 10 tends to create rotational swirling motion and turbulence of the water within brewing chamber 10, to cause the water to readily dissolve and mix with powdered coffee positioned at the bottom of the chamber 10. The jet of water may hit the liner bottom near the wall, and create a turbulence there. As the liner begins to fill, the jet causes a swirling motion of the liquid which aids in dissolution of the powdered coffee. Nozzle 37 has a relatively small opening and the consequent high velocity of the water as it exits from nozzle 37 will cause the water's turbulence and rotation. The positioning of nozzle 37 within the curved liner wall and in a plane perpendicular to a radius of the liner causes the high speed water jet to impinge with high velocity, and to swirl around, which optimizes the rotation of the water as it enters brewing chamber 10 with maximum angular momentum. Alternatively, the jet may first hit the side wall, to create a helical and swirling motion. In any event the entire body of water is caused to rotate about the vertical axis of the liner, so that coffee at the bottom of the liner will be readily dissolved. For this purpose, the bottom of the liner may be dished to facilitate the dissolution. The downward angular positioning of nozzle 37 will increase the swirling action and turbulence of the water especially when the incoming water strikes the liner bottom or water already in the liner, which aids in the dissolving action. Nozzle 37 need not be positioned at the top of liner 6 but a position near the top is desirable because both the turbulence and rotation of the water caused by the nozzle's positioning would be reduced if the nozzle were immersed in the brewed coffee due to a lower nozzle position. The cylindrical shape of liner 6 helps promote uniform mixing as there are no features that stop the rotational motion and no areas where the water is relatively calm. However, other shapes (e.g. oval or polygonal) may prove useful also.

Pump 34 is activated by a switch operated by brew button 40 for a time period determined by timer 43. Since pump 34 transfers water at a known rate for a known time period, a predetermined quantity of water is transferred. Timer 43 activates pump 34 for time periods which may be correlated with the coffee level in brewing chamber 10 as shown by gauge glass 31. This permits timer 43 to be calibrated essentially linearly in terms of actual volume of coffee produced, an advantage over regular coffee brewers, because there is no shrinkage of the water volume due to absorption and retention of the water by coffee grounds. Typical parameters for the coffee brewer are a transfer rate, by pump, of 1 gallon per minute from heating chamber 7 to brewing chamber 10 and capacities of eleven gallons in heating chamber 7 and four gallons in brewing chamber 10.

It should be understood, however, that it is also possible to transfer the water from heating chamber 7 to brewing chamber 10 without a pump. For example, with an enclosed heating chamber, the transfer may be effected solely by the pressure in the inlet pipe, upon opening a solenoid valve such as 19 with the amount of water transferred controlled by either a timer, if the water is transferred at a known rate, or a level float placed within brewing chamber 10.

Figure 2:
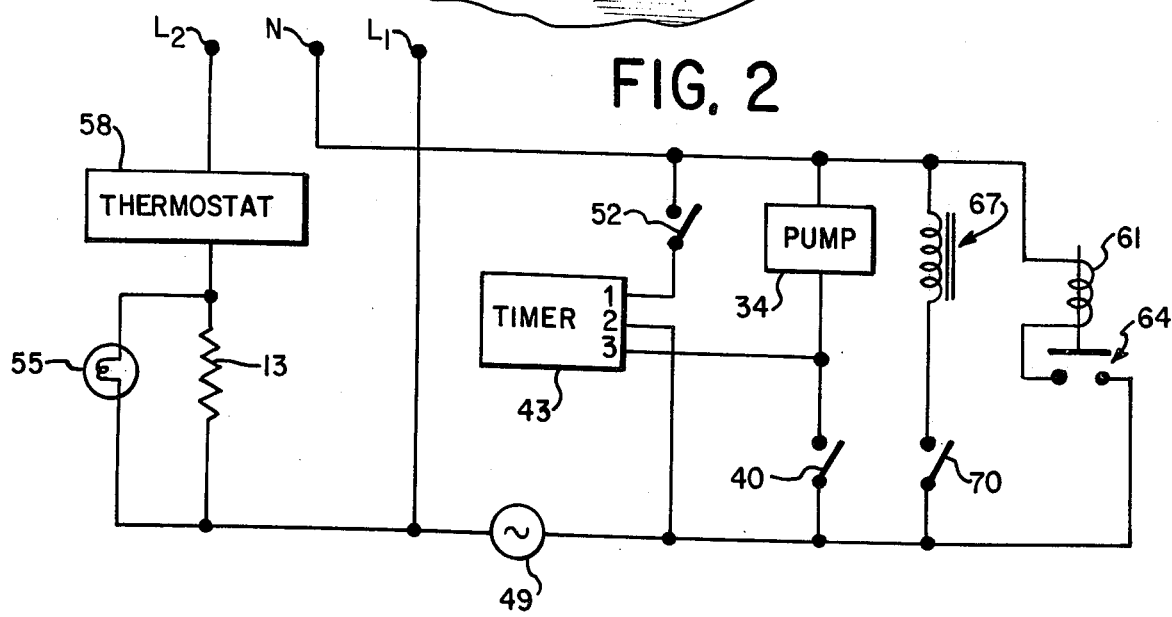
FIG. 2 is a diagram of an electrical circuit useful with the instant coffee brewer.

The electrical circuit is best understood by reference to the circuit diagram in FIG. 2. A three-wire 60-cycle power source is used with inputs L1, L2 and N to the electrical circuit. Heating element 13 and pilot light 55 are connected in parallel in a series circuit with thermostat 58 immersed in the heating chamber. Thermostat 58 controls the currents through both heating element 13 and pilot light 55. Pilot light 55 is thus on when current is flowing through heating element 13. When the water temperature in heating chamber 7 reaches a predetermined temperature, thermostat 58 turns off the current through both heating element 13 and pilot light 55. The terminals of this circuit are then connected to outside power terminals L1 and L2. Two terminals of a suitable timer 43, stop cycle switch 52 and fuse 49 are series connected between terminals N and L1. One terminal of pump 34 is connected to terminal N and the other terminal of pump 34 is connected to both the third terminal of timer 43 and one terminal of brew button 40. A second terminal of brew button 40 is connected to the junction of timer 43 and fuse 49. Relay 67 and level float switch 70, activated by level float 22 in heating chamber 7, are series-connected between terminal N and the junction of timer 43 and fuse 49. A series circuit of solenoid 61 and relay contacts 64 is also connected between terminal N and the junction of timer 43 and fuse 49. Opening or closing of level float switch 70 by level float 22 energizes or deenergizes relay 67 and results in opening or closing solenoid valve 19. Closing brew button 40 causes pump 34 to be activated for a time period controlled by timer 43 which has an internal switch between terminals 2 and 3. This switch closes for a predetermined time as set by the timer and activates pump 34. Opening stop cycle switch 52 opens this switch and stops the cycle.

The operation of the coffee maker will now be described. Water flows into heating chamber 7 from inlet 16 until the desired water level is reached and level float 22 activates and closes solenoid valve 19 to stop the incoming water flow. The water is heated by heating element 13 and instant coffee is placed on the bottom of brewing chamber 10. After the water in heating chamber 7 has been heated to the desired temperature, as indicated by pilot light 55 going off, brew button 40 may be pushed to activate pump 34 and transfer water for a time period determined by timer 43. If it is desired to stop the brewing process, stop cycle switch 52 may be turned on and pump 34 will be turned off. Since the pumping rate of pump 34 is known, timer 43 is preferably calibrated, as previously described, in terms of gallons pumped and coffee produced rather than time. The water enters brewing chamber 10 through nozzle 37 which is positioned near the top of the wall of liner 6 and pointed sidewardly and downwardly as previously described. The small exit of nozzle 37 and its configuration impart a high downward velocity to the water that is approximately along the liner wall. This imparts a rotational motion, about the vertical axis of liner 6, as well as turbulence to the water. This rotational motion and turbulence causes the instant coffee placed within brewing chamber 10 to dissolve rapidly and mix uniformly with the water. This will usually require no more than several minutes. Fresh coffee may be withdrawn from brewing chamber 10 through the outlet in the liner bottom and spigot 28. As the coffee level in brewing chamber 10 decreases, inspection of gauge glass 31 enables the amount of coffee remaining to be determined. Instant coffee may be added to brewing chamber 10 and timer 43 set so that pump 34 will pump sufficient water into brewing chamber 10 to restore the desired coffee level. The amount of water added should, of course, be the amount necessary to make coffee of the desired strength from the instant coffee and water added. When brew button 40 is activated, the desired coffee level is restored as water is pumped into brewing chamber 10. As water is pumped from heating chamber 7 into brewing chamber 10, level float 22 lowers and causes solenoid valve 19 to open and additional water enters heating chamber 7 through valve 19 until the water again reaches the desired level and level float 22 causes solenoid valve 19 to close.

Although brewing chamber 10 is not, in the embodiment described, positioned proximate heating element 13, it is positioned within heating chamber 7. This keeps the brewed coffee warm since the water in heating chamber 7 is kept hot and maintains the coffee in brewing chamber 10 at approximately the same temperature.

Although the preferred embodiment of the invention has been described, certain variations, for example, placing brewing chamber 10 outside of heating chamber 7, will be obvious to one having ordinary skill in the art, and it is therefore intended that the invention not be limited to the particular embodiment herein described, but rather that the scope of the invention should be determined by reference to the appended claims.

What is claimed is:
1. A coffee brewer for instant coffee comprising:
 a water-heating chamber;
 a heating element positioned proximate said heating chamber for heating water in said chamber;
 a brewing chamber;
 a nozzle associated with said brewing chamber, said nozzle being positioned near the top of the wall of said brewing chamber and in a plane substantially parallel to said wall of said brewing chamber and pointing partially downwardly and partially horizontally to create a swirling movement of water entering said brewing chamber; and
 means for transferring a predetermined amount of water from said heating chamber to said brewing chamber nozzle.

2. A coffee brewer as in claim 1, wherein said brewing chamber is contained within said water-heating chamber and arranged to be normally immersed in the water in said heating chamber, whereby the contents of said brewing chamber are maintained at near the temperature of said water without necessity for a separate heater means.

3. A coffee brewer as in claim 1, further comprising an outlet for said brewing chamber, spigot communicating with said outlet to control exiting of brewed coffee from said brewing chamber, and a gauge glass communicating with said outlet for indicating the level of said brewed coffee.

4. A coffee brewer as recited in claim 1 further comprising:
 a water inlet connected to said heating chamber;
 a solenoid-activated valve connecting said inlet and said heating chamber; and
 means for opening and closing said valve, said opening and closing means being responsive to the water level in said heating chamber.

5. An instant coffee brewer as recited in claim 1 wherein said means for transferring comprises:
 a pump connected between said nozzle and said heating chamber; and
 a timer electrically connected to said pump for controlling the duration of activation of said pump.

6. An instant coffee brewer as recited in claim 5 wherein said brewing chamber is cylindrical.

7. An instant coffee brewer as recited in claim 6 wherein said nozzle is positioned proximate the wall of said brewing chamber.

8. An instant coffee brewer as recited in claim 6 wherein said nozzle points downwardly at an angle of about 45°.

9. An instant coffee brewer as recited in claim 1 wherein said brewing chamber is cylindrical.

10. An instant coffee brewer as recited in claim 9 wherein said nozzle is positioned proximate the wall of said brewing chamber.

11. An instant coffee brewer as recited in claim 9 wherein said nozzle points downwardly at an angle of about 45°.

* * * * *